US011875725B2

(12) United States Patent
Cho et al.

(10) Patent No.: US 11,875,725 B2
(45) Date of Patent: Jan. 16, 2024

(54) DISPLAY DEVICE AND METHOD OF DRIVING THE SAME

(71) Applicant: LG Display Co., Ltd., Seoul (KR)

(72) Inventors: Won Cho, Paju-si (KR); Kyoung Sik Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/042,761

(22) PCT Filed: Aug. 20, 2021

(86) PCT No.: PCT/KR2021/011070

§ 371 (c)(1),
(2) Date: Feb. 23, 2023

(87) PCT Pub. No.: WO2022/045676

PCT Pub. Date: Mar. 3, 2022

(65) Prior Publication Data

US 2023/0306890 A1 Sep. 28, 2023

(30) Foreign Application Priority Data

Aug. 24, 2020 (KR) ........................ 10-2020-0106160

(51) Int. Cl.
*G09G 3/20* (2006.01)
*G09G 3/3208* (2016.01)

(52) U.S. Cl.
CPC ......... *G09G 3/2092* (2013.01); *G09G 3/3208* (2013.01); *G09G 2300/0819* (2013.01); *G09G 2310/061* (2013.01); *G09G 2310/08* (2013.01); *G09G 2320/0233* (2013.01); *G09G 2320/0247* (2013.01)

(58) Field of Classification Search
USPC .......................................................... 345/691
See application file for complete search history.

(56) References Cited

U.S. PATENT DOCUMENTS

2015/0170578 A1* 6/2015 Choi .................... G09G 3/3266 345/212
2016/0117995 A1* 4/2016 Lee .......................... G09G 3/20 345/691
2017/0053625 A1* 2/2017 Yu ............................ G09G 5/12
2019/0051237 A1* 2/2019 Byeon .................. G09G 3/3225
(Continued)

FOREIGN PATENT DOCUMENTS

KR 10-2013-0000555 A 1/2013
KR 10-2018-0131705 A 12/2018
(Continued)

*Primary Examiner* — Chineyere D Wills-Burns
(74) *Attorney, Agent, or Firm* — Seed IP Law Group LLP

(57) ABSTRACT

A display device including a display panel according to an embodiment of the present application includes a plurality of pixels, a timing controller configured to receive a compensation command signal in a vertical blank period in which no image data are written in the pixels, and a sensing circuit configured to sense driving properties of the pixels in at least one sensing period corresponding to the compensation command signal, wherein a length of the vertical blank period is different from each other in a first frame and a second frame, and a number of sensing periods having a predetermined length varies depending on the length of the vertical blank period.

20 Claims, 15 Drawing Sheets

(56) References Cited

U.S. PATENT DOCUMENTS

| | | | | |
|---|---|---|---|---|
| 2019/0197960 | A1* | 6/2019 | Kim | G09G 3/035 |
| 2019/0378459 | A1* | 12/2019 | Kim | G09G 3/3291 |
| 2020/0074932 | A1* | 3/2020 | Park | G09G 3/3291 |
| 2020/0135146 | A1* | 4/2020 | Lee | G09G 5/10 |
| 2021/0201746 | A1* | 7/2021 | Seo | G09G 3/3233 |

FOREIGN PATENT DOCUMENTS

| | | | |
|---|---|---|---|
| KR | 10-2019-0140760 | A | 12/2019 |
| KR | 10-2020-0030853 | A | 3/2020 |

* cited by examiner

<POINT IN TIME AT WHICH N-TH FRAME IMAGE PROCESSING IS COMPLETED>

<POINT IN TIME AT WHICH (N+1)-TH FRAME IMAGE IS BEING PROCESSED>

DISPLAY DEVICE AND METHOD OF DRIVING THE SAME

TECHNICAL FIELD

The present disclosure relates to an electroluminescent display device.

BACKGROUND ART

An electroluminescent display device is classified as an inorganic light-emitting display device or an organic light-emitting display device based on the material for an emission layer. Each pixel of the electroluminescent display device includes a self-luminous light-emitting element, and the amount of light emitted from the light-emitting element is controlled using data voltage based on gradation of image data to adjust luminance of the light-emitting element.

The electroluminescent display device adopts external compensation technology in order to improve image quality. The external compensation technology is technology of sensing pixel voltage or current based on electrical properties of pixels and modulating input image data based on the result of sensing to compensate for deviation in electrical properties between the pixels.

In the conventional external compensation technology, however, a compensation cycle for a pixel is changed when a frame frequency is abruptly changed, whereby image spots or afterimage due to compensation delay may be incurred. In addition, abrupt fluctuation of luminance at the point in time of compensation update may be visible as flicker.

Technical Problem

It is an object of the present disclosure to provide a display device configured such that compensation cycle delay and image defects are minimized even though a frame frequency is variable depending on an input image when variation in electrical properties between pixels is compensated for using an external compensation scheme and a method of driving the same.

Technical Solution

A display device according to an embodiment of the present application includes a display panel including a plurality of pixels, a timing controller configured to receive a compensation command signal in a vertical blank period in which no image data are written in the pixels, and a sensing circuit configured to sense driving properties of the pixels in at least one sensing period corresponding to the compensation command signal, wherein a length of the vertical blank period is different from each other in a first frame and a second frame, and a number of sensing periods having a predetermined length varies depending on the length of the vertical blank period.

Advantageous Effects

In this embodiment, when variation in electrical properties between pixels is compensated for using an external compensation scheme, the number of times of sensing is increased in proportion to the length of a vertical blank period (i.e. multi-sensing) even though a frame frequency is variable depending on an input image, whereby it is possible to minimize compensation cycle delay and image defects.

In this embodiment, in the case in which a plurality of compensation command signals is present in one vertical blank period for multi-sensing, the time interval between a last compensation command signal, among the compensation command signals, and the point in time at which a subsequent active period is commenced is fixed to one sensing period irrespective of the length of the vertical blank period according to variation of the frame frequency, whereby it is possible to easily apply SLC technology and to minimize a cognitive error due to sensing.

The effects of this embodiment are not limited to the above effects, and more various effects are included in this specification.

DETAILED DESCRIPTIONS

Figure 1:
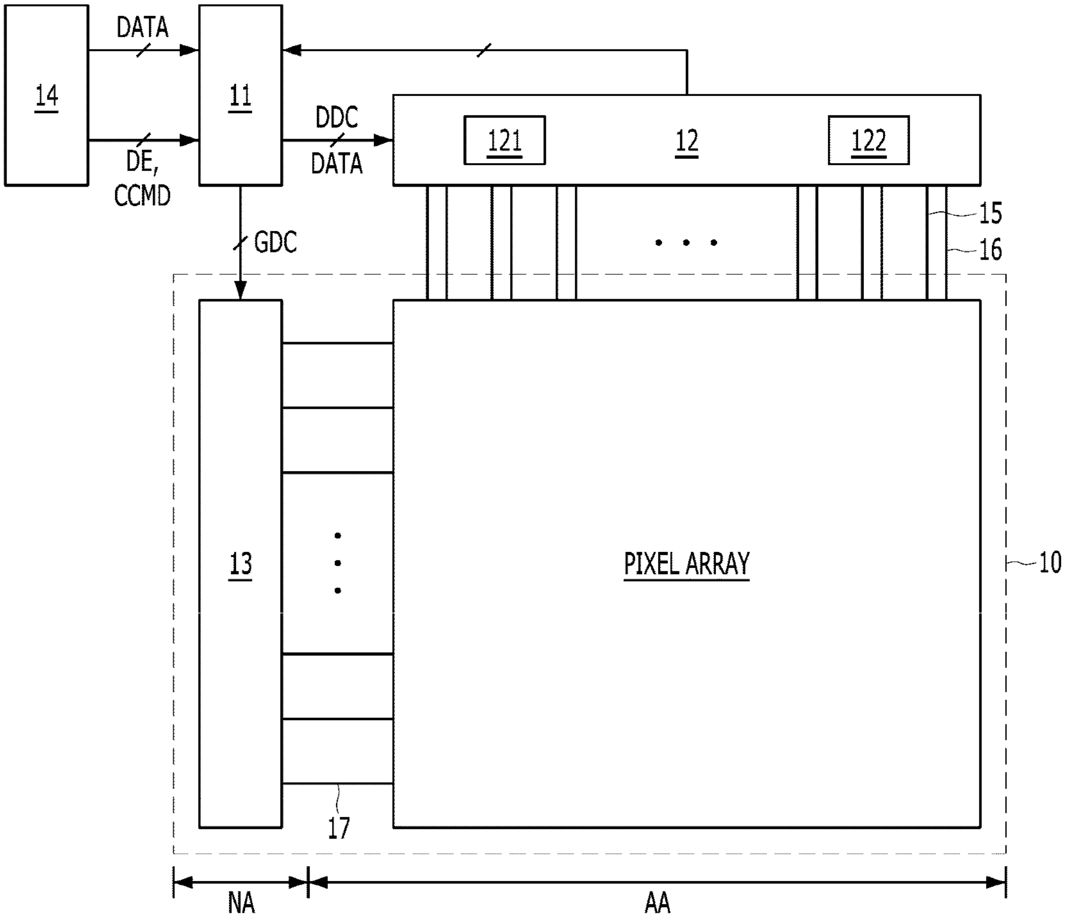
FIG. 1 is a view showing an electroluminescent display device according to an embodiment of the present disclosure.

Advantages and features of the present disclosure and methods of achieving the same will be more clearly understood from embodiments described below with reference to the accompanying drawings. However, the present disclosure is not limited to the following embodiments and may be implemented in various different forms. The embodiments are provided merely to complete the disclosure of the present disclosure and to fully inform a person having ordinary skill in the art to which the present disclosure pertains of the category of the present disclosure.

In the drawings for explaining the exemplary embodiments of the present disclosure, for example, the illustrated shape, size, ratio, angle, and number are given by way of example, and thus, are not limitative of the disclosure of the present disclosure. Throughout the present specification, the same reference numerals designate the same constituent elements. The terms "comprises", "includes", and/or "has", used in this specification, do not preclude the presence or addition of other elements unless used along with the term "only." The singular forms are intended to include the plural forms as well, unless the context clearly indicates otherwise.

In the interpretation of constituent elements included in the various embodiments of the present disclosure, the constituent elements are interpreted as including an error range even if there is no explicit description thereof.

When describing positional relationships, for example, when the positional relationship between two parts is described using "on", "above", "below", "aside", or the like, one or more other parts may be located between the two parts unless the term "directly" or "closely" is used therewith.

In the description of the various embodiments of the present disclosure, although terms such as, for example, "first" and "second" may be used to describe various elements, these terms are merely used to distinguish the same or similar elements from each other. Therefore, in the present specification, an element modified by "first" may be the same as an element modified by "second" within the technical scope of the present disclosure unless mentioned otherwise.

Throughout the present specification, the same reference numerals designate the same constituent elements.

In the present disclosure, a pixel circuit and a gate driver on a substrate of a display panel may be implemented by a thin film transistor (TFT) having an n-type metal oxide semiconductor field effect transistor (MOSFET). However, the present disclosure is not limited thereto. The pixel circuit and the gate driver may be implemented by a TFT having a p-type MOSFET. The TFT is a three-electrode element including a gate, a source, and a drain. The source is an electrode that supplies a carrier to the transistor. In the TFT, the carrier starts to flow from the source. The drain is an electrode of the TFT from which the carrier is discharged outside. That is, in the MOSFET, the carrier flows from the source to the drain. For an n-type TFT (NMOS), the carrier is an electron, and therefore source voltage is lower than drain voltage such that the electron can flow from the source to the drain. In the n-type TFT, current flows from the drain to the source, since the electron flows from the source to the drain. In contrast, for a p-type TFT (PMOS), the carrier is a hole, and therefore source voltage is higher than drain voltage such that the hole can flow from the source to the drain. In the p-type TFT, current flows from the source to the drain, since the hole flows from the source to the drain. It should be noted that the source and drain of the MOSFET are not fixed. For example, the source and drain of the MOSFET may be changed depending on applied voltage. In a description of an embodiment of the present disclosure, therefore, one of the source and drain will be referred to as a first electrode, and the other of the source and drain will be referred to as a second electrode.

In the following description, a detailed description of known functions and configurations incorporated herein will be omitted when it may make the subject matter of the present disclosure rather unclear. Hereinafter, embodiments of the present disclosure will be described in detail with reference to the accompanying drawings.

Figure 2:
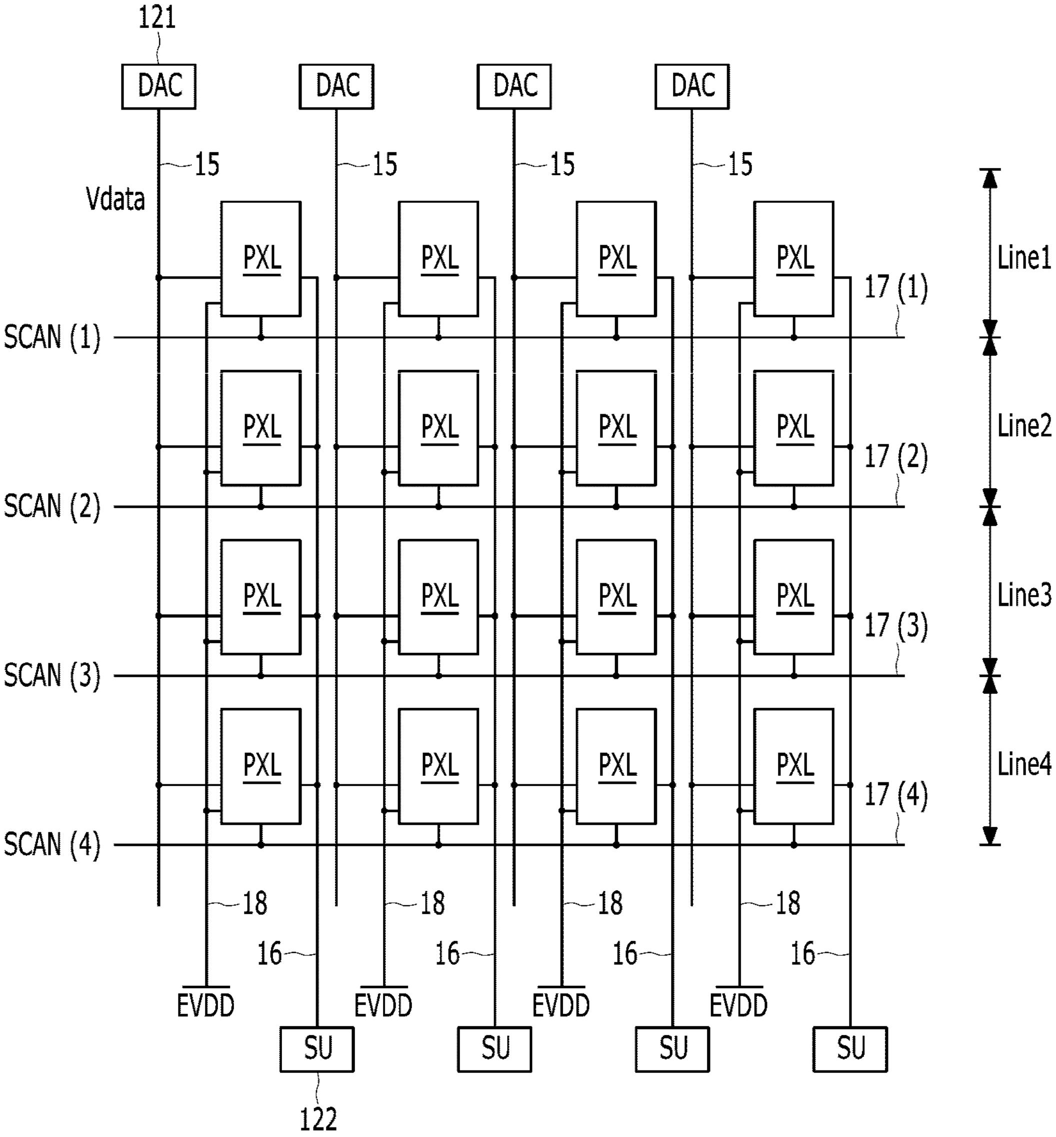
FIG. 2 is a view showing a pixel array included in the electroluminescent display device of FIG. 1.
Figure 3:
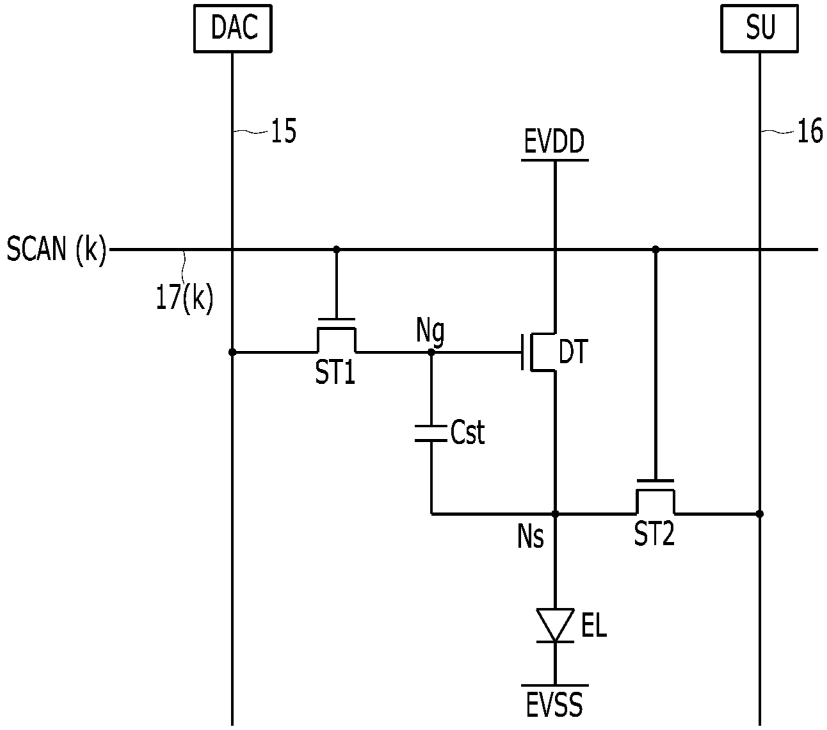
FIG. 3 is an equivalent circuit diagram of one pixel included in the pixel array of FIG. 2.
Figure 4:
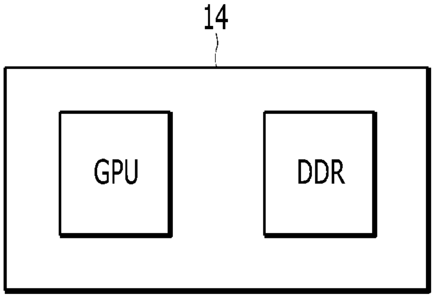
FIG. 4 is a view showing a construction for varying a frame frequency in a host system.
Figure 5:
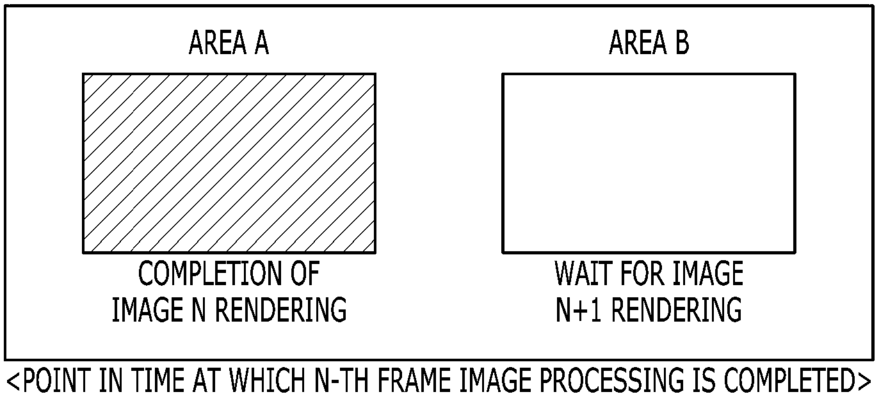
FIGS. 5 and 6 are views illustrating a memory control operation related to data rendering of the host system.
Figure 6:
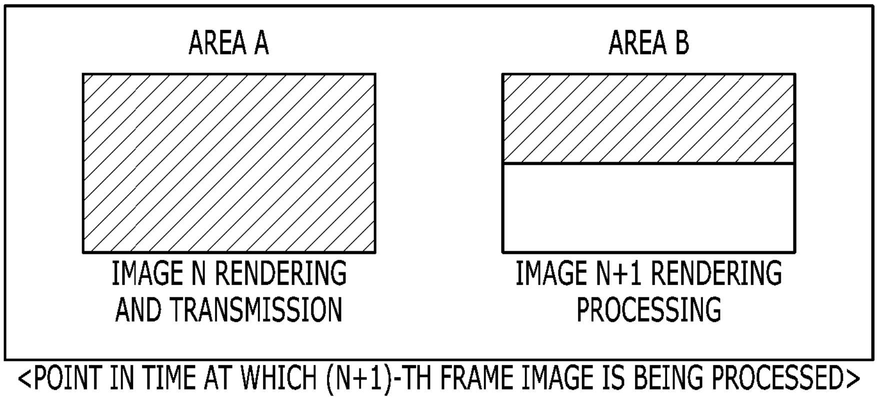

FIG. 1 is a view showing an electroluminescent display device according to an embodiment of the present disclosure. FIG. 2 is a view showing a pixel array included in the electroluminescent display device of FIG. 1. FIG. 3 is an equivalent circuit diagram of one pixel included in the pixel array of FIG. 2. FIG. 4 is a view showing a construction for varying a frame frequency in a host system. FIGS. 5 and 6 are views illustrating a memory control operation related to data rendering of the host system.

Referring to FIGS. 1 to 3, the display device according to the embodiment of the present disclosure may include a display panel 10, a timing controller 11, a panel drive circuit 121 and 13, and a sensing circuit 122. The panel drive circuit 121 and 13 includes a digital-analog converter (hereinafter referred to as a DAC) 121 connected to data lines 15 of the display panel 10 and a gate driver 13 connected to gate lines 17 of the display panel 10. The panel drive circuit 121 and 13 and the sensing circuit 122 may be mounted in a data integrated circuit 12.

The display panel 10 may be provided with a plurality of data lines 15 and readout lines 16 and a plurality of gate lines 17. Pixels PXL may be disposed in an intersection area of the data lines 15, the readout lines 16, and the plurality of gate lines 17. As shown in FIG. 2, a pixel array may be formed in a display area AA of the display panel 10 by the pixels PXL, which are disposed in a matrix.

In the pixel array, the pixels PXL may be divided by pixel group lines in one direction. Each of the pixel group lines Line 1 to Line 4 includes a plurality of pixels PXL neighboring each other in an extension direction of the gate line 17 (or a horizontal direction). The pixel group line is not a physical signal line but means a set of pixels PXL disposed neighboring each other in one horizontal direction. Consequently, pixels PXL constituting an identical pixel group line may be connected to an identical gate line 17. Pixels PX constituting an identical pixel group line may be connected to different data lines 15; however, the present disclosure is not limited thereto. Pixels PX constituting an identical pixel group line may be connected to different readout lines 16; however, the present disclosure is not limited thereto. A plurality of pixels PXL implementing different colors may share a single readout line 16.

In the pixel array, each of the pixels PXL may be connected to the DAC 121 via the data line 15, and may be connected to the sensing circuit 122 via the readout line 16. The sensing circuit 122 may be mounted in the data integrated circuit 12 together with the DAC 121; however, the present disclosure is not limited thereto. The sensing circuit 122 may be mounted in a control printed circuit board (not shown) outside the data integrated circuit 12.

In the pixel array, each of the pixels PXL may be connected to a high-potential pixel power EVDD via a high-potential power line 18. In addition, each of the pixels PXL may be may be connected to the gate driver 13 via a corresponding one of the gate lines 17(1) to 17(4).

In the pixel array, the pixels PXL may include pixels configured to implement a first color, pixels configured to implement a second color, and pixels configured to implement a third color, and may further include pixels configured to implement a fourth color. Each of the first color to the fourth color may be any one of red, green, blue, and white.

Each pixel may be implemented as shown in FIG. 3; however, the present disclosure is not limited thereto. One pixel PXL disposed in a k-th (k being an integer) pixel group line may include a light-emitting element EL, a drive thin film transistor (TFT) DT, a storage capacitor Cst, a first switch TFT ST1, and a second switch TFT ST2. The first switch TFT ST1 and the second switch TFT ST2 may be connected to the same gate line 17(*k*).

The light-emitting element EL emits light depending on pixel current. The light-emitting element EL includes an anode connected to a source node Ns, a cathode connected to a low-potential pixel power EVSS, and an organic or inorganic compound layer located between the anode and the cathode. The organic or inorganic compound layer includes a hole injection layer (HIL), a hole transport layer (HTL), an emission layer (EML), an electron transport layer (ETL), and an electron injection layer (EIL). When voltage applied to the anode becomes equal to or higher than operating point voltage, compared to the low-potential pixel power EVSS applied to the cathode, the light-emitting element EL is turned on. When the light-emitting element EL is turned on, a hole that has passed through the hole transport layer (HTL) and an electron that has passed through the electron transport layer (ETL) move to the emission layer (EML) to form an exciton. As a result, the emission layer (EML) generates light.

The drive TFT DT is a drive element. The drive TFT DT generates pixel current that flows in the light-emitting element EL depending on voltage difference between a gate node Ng and a source node Ns. The drive TFT DT includes a gate electrode connected to the gate node Ng, a first electrode connected to the high-potential pixel power EVDD, and a second electrode connected to the source node Ns. The storage capacitor Cst is connected between the gate node Ng and the source node Ns to store voltage between the gate and the source of the drive TFT DT.

The first switch TFT ST1 turns on the flow of current between the data line 15 and the gate node Ng according to a scan signal SCAN(k) to apply data voltage charged in the data line 15 to the gate node Ng. The first switch TFT ST1 includes a gate electrode connected to the gate line 17(*k*), a first electrode connected to the data line 15, and a second electrode connected to the gate node Ng. The second switch TFT ST2 turns on the flow of current between the readout line 16 and the source node Ns according to the scan signal SCAN(k) to transmit voltage of the source node Ns depending on pixel current to the readout line 16. The second switch TFT ST2 includes a gate electrode connected to the gate line 17(*k*), a first electrode connected to the source node Ns, and a second electrode connected to the readout line 16.

The above pixel structure is merely an illustration, and it should be noted that the technical idea of the present disclosure is not limited to the pixel structure and may be applied to various pixel structures capable of sensing electrical properties (threshold voltage or electron mobility) of the drive TFT DT.

A host system 14 is connected to the timing controller 11 via various interface circuits, and transmits various signals DATA, DE, and CCMD necessary to drive the panel to the timing controller 11. As shown in FIG. 4, the host system 14 includes a graphics processing unit GPU and a memory DDR, and may process an input image source so as to be fit for the purpose according to a predetermined application and may transmit the processed image source to the timing controller 11. Since the image source is input in the form of streaming, it is necessary to temporarily store the image source in the memory DDR for data processing. In general, the image source is processed in units of one frame in order to reduce cost and complexity incurred in data processing.

The graphics processing unit GPU performs a data rendering operation in a mode of processing image data in units of one frame and storing the image-processed frame data in the memory DDR using a draw command. The memory DDR may include two divided areas A and B such that the data rendering operation and a transmission operation are simultaneously performed in different areas, as shown in FIGS. 5 and 6. While a rendering operation for N-th frame image data is performed in area A, (N−1)-th frame image data may be transmitted in a state of being synchronized with a data enable signal DE in area B. Subsequently, when the rendering operation for the N-th frame image data is completed, the graphics processing unit GPU transmits the N-th frame image data from area A to the timing controller 11 in a state of being synchronized with the data enable signal DE. At this time, the graphics processing unit GPU performs image processing for (N+1)-th image data, and performs a rendering operation for the (N+1)-th frame image data with respect to area B.

Complexity of an input image may be changed in real time. Time incurred in rendering processing is longer for a complex image than a simple image. For this reason, time incurred in data transmission in a first area and time incurred in data rendering in a second area of the memory DDR may not coincide with each other. For example, in the case in which the (N+1)-th frame image data is more complex than the N-th frame image data, the graphics processing unit GPU may perform the rendering operation for the (N+1)-th frame image data in area B even at the point in time at which transmission of the N-th frame image data is completed in area A. At this time, the graphics processing unit GPU may decrease the rate of a frame frequency while extending a vertical blank period until the rendering operation for the (N+1)-th frame image data is completed. In this case, transmission of the (N+1)-th frame image data in a state of being incompletely rendered may be prevented. During the vertical blank period, image data are not transmitted, since the data enable signal DE is transmitted only in a logic-low state without transition. In the present disclosure, a vertical active period may be defined as a period in which image data are written in the display panel 10 in a state of being matched with the transition of the data enable signal DE in each frame. A vertical blank period may be defined as a period in which a data enable signal DE remains only in a logic-low state without transition between two neighboring vertical active periods and no image data are written in the display panel 10.

As described above, the graphics processing unit GPU may secure data rendering time by varying the length of the vertical blank period depending on complexity of an image. When the length of a vertical blank period in one frame is changed, the rate of a frame frequency is variable, which is called variable refresh rate (VRR) technology. The VRR technology varies the rate of a frame frequency depending on an input image in order to inhibit a tearing phenomenon of the image and to provide a more softened image screen. The vertical blank period is shortest at the highest frame frequency within a predetermined variable frame frequency range, and increases as the frame frequency is lowered. Meanwhile, in a variable frame frequency environment, the length of the vertical blank period is changed depending on the rate of a frame frequency, but the length of a vertical active period is fixed irrespective thereof. During the vertical active period, image data DATA are written in the pixel array of the display panel 10. When the length of the vertical active period is fixed in the variable frame frequency environment, therefore, it is possible to more easily control the operation of the panel drive circuit 121 and 13.

When the data rendering operation is completed in the first area or the second area, the graphics processing unit GPU generates at least one compensation command signal CCMD in the vertical blank period and transmits the generated compensation command signal to the timing controller 11, prior to transmission of the rendered image data. In the variable frame frequency environment, in which the length of the vertical blank period is changed depending on the rate of the frame frequency, the graphics processing unit GPU may adjust the number of compensation command signals CCMD in proportion to the length of the vertical blank period. In the case in which a plurality of compensation command signals CCMD is generated in one vertical blank period, a time interval between neighboring compensation command signals CCMD may correspond to one sensing period. It is preferable for the time interval between the compensation command signals CCMD, i.e. one sensing period, to be designed so as to have a predetermined length in order to improve reliability and accuracy of sensing.

In the same vertical blank period, the number of sensing periods may be designed so as to correspond to the number of compensation command signals CCMD. Since the number of compensation command signals CCMD is designed so as to be proportional to the length of the vertical blank period, the number of sensing periods may increase in proportion to the length of the vertical blank period. For example, on the assumption that the frequency of a second frame is lower than the frequency of a first frame, the length of a second vertical blank period belonging to the second frame is longer than the length of a first vertical blank period belonging to the first frame. At this time, the number of sensing periods located in the second vertical blank period is greater than the number of sensing periods located in the first vertical blank period. During one sensing period, a predetermined number of pixels are sensed and compensated for. In the case in which the number of sensing periods is increased in proportion to the length of the vertical blank period, it is possible to solve a problem that occurs as a result of a compensation period being delayed in the variable frame frequency environment (e.g. image spots or afterimage, flicker, etc.)

After transmitting the compensation command signal CCMMD corresponding to the sensing period to the timing controller 11, the graphics processing unit GPU transmits a data enable signal DE of a subsequent frame and image data synchronized therewith to the timing controller 11.

Meanwhile, in order to prevent a time interval between a compensation command signal CCMD located in one vertical blank period and a vertical active period of a subsequent frame from varying depending on the rate of a frame frequency, the graphics processing unit GPU may delay a start point in time of the vertical active period of the subsequent frame as needed, whereby it is possible to uniformly fix the time interval (i.e. fix the time interval as one sensing period) irrespective of the length of the vertical blank period. In this case, reliability and accuracy in sensing and compensation are further improved.

The host system 14 may be implemented by an application processor, a personal computer, or a set-top box; however, the present disclosure is not limited thereto. The host system 14 may be mounted on a system board; however, the present disclosure is not limited thereto. The host system 14 may further include an input unit configured to receive a user command/data and a main power supply configured to generate main power.

The timing controller 11 receives a data enable signal DE synchronized with a variable frame frequency, input image data IDATA, and a compensation command signal CCMD from the host system 14.

The timing controller 11 may control operation timing of the panel drive circuit 121 and 13 and the sensing circuit 122 such that display driving, sensing driving, and luminance recovery driving are temporally separated from each other based on the data enable signal DE and the compensation command signal CCMD.

Display driving is driving in which first data voltage for display driving (hereinafter referred to as data voltage for display) is written in pixel group lines in a vertical active period in one frame to reproduce an input image on the display panel 10. Sensing driving is driving in which second data voltage (hereinafter referred to as data voltage for sensing) is written in pixels PXL disposed in a specific pixel group line (hereinafter referred to a sensing pixel group line) in a vertical blank period in one frame to sense and compensate for electrical properties of corresponding pixels PXL. Luminance recovery driving is driving in which third data voltage having a luminance compensation gain applied thereto (hereinafter referred to as data voltage for luminance recovery) is written in the pixels PXL in the sensing pixel group line for which the sensing operation has been completed to compensate for luminance loss due to the sensing operation. The third data voltage may be different from the first data voltage, since the third data voltage is voltage obtained by applying the luminance compensation gain to the first data voltage. Luminance recovery driving is performed until data voltage for display of a subsequent frame is written in the pixels PXL disposed in the sensing pixel group line.

The timing controller 11 may generate a first data/gate control signal DDC/GDC for controlling operation timing of the panel drive circuit 121 and 13 based on timing signals, such as a data enable signal DE, at the time of display driving. The timing controller 11 may generate a second data/gate control signal DDC/GDC for controlling operation timing of the panel drive circuit 121 and 13 based on timing signals, such as a data enable signal DE, at the time of sensing driving. In addition, the timing controller 11 may generate a third data/gate control signal DDC/GDC for controlling operation timing of the panel drive circuit 121 and 13 based on timing signals, such as a data enable signal DE, at the time of luminance recovery driving.

The timing controller 11 may individually control display driving timing, sensing driving timing, and luminance recovery driving timing for the pixel group lines of the display panel 10 based on the data/gate control signal DDC/GDC such that electrical properties of the pixels PXL are sensed and compensated for in units of a pixel group line in real time during image display.

The timing controller 11 may control operation of the panel drive circuit 121 and 13 such that display driving is implemented in a vertical active period in one frame, and may control operation of the panel drive circuit 121 and 13 and the sensing circuit 122 such that sensing driving is implemented in a vertical blank period before the vertical active period in the one frame. In addition, the timing controller 11 may control operation of the panel drive circuit 121 and 13 such that luminance recovery driving is implemented between the point in time at which sensing driving is completed and the point in time at which display driving is commenced.

A vertical active period is a period which corresponds to a transition period of a data enable signal DE and in which data voltage for display are written in pixels PXL in all pixel group lines. A vertical blank period, which is a period which corresponds to a non-transition period of a data enable signal DE and in which writing of data voltage for display is interrupted, includes a sensing period, and may partially include a luminance recovery period. In the sensing period, data voltage for sensing may be written in the pixels PXL disposed in the sensing pixel group line, and in the luminance recovery period, which follows the sensing period, data voltage for luminance recovery may be written in the pixels PXL disposed in the sensing pixel group line.

The gate driver 13 may separately generate a scan signal for display SCAN, a scan signal for sensing, and a scan signal for luminance recovery under control of the timing controller 11.

In order to implement display driving, the gate driver 13 may generate a scan signal for display according to the first gate control signal GDC in the vertical active period, and may sequentially supply the generated scan signal for display to the gate lines 17 connected to the pixel group lines.

In order to implement sensing driving, the gate driver 13 may generate a scan signal for sensing according to the second gate control signal GDC in the vertical blank period, and may supply the generated scan signal for sensing to the gate line 17 connected to the sensing pixel group line. Subsequently, in order to implement luminance recovery driving, the gate driver 13 may generate a scan signal for luminance recovery according to the third gate control signal GDC, and may further supply the generated scan signal for luminance recovery to the gate line 17 connected to the sensing pixel group line.

The number of pixel group lines in which sensing driving is performed may be set depending on the length of the vertical blank period. The position of the sensing pixel group line may be randomly dispersed. In the case in which the position of the sensing pixel group line is randomly dispersed, the position of the sensing pixel group line may be less recognized by a user due to a visual integral effect.

The gate driver 13 may be formed in a non-display area NA of the display panel 10 in a gate-driver in panel (GIP) scheme.

The DAC 121 is connected to the data lines 15. The DAC 121 may separately generate data voltage for display, data voltage for sensing, and data voltage for luminance recovery under control of the timing controller 11.

In order to implement display driving, the DAC 121 may convert image data DATA into data voltage for display according to the first data control signal DDC in the vertical active period, and may supply the data voltage for display to the data lines 15 in a state of being synchronized with the scan signal for display.

In order to implement sensing driving, the DAC 121 may generate a predetermined level of data voltage for sensing according to the second data control signal DDC in the vertical blank period, and may supply the data voltage for sensing to the data lines 15 in a state of being synchronized with the scan signal for sensing.

In order to implement luminance recovery driving, the DAC 121 may convert image data DATA having a luminance compensation gain further reflected therein into data voltage for luminance recovery according to the third data control signal DDC, and may supply the data voltage for luminance recovery to the data lines 15 in a state of being synchronized with the scan signal for luminance recovery.

The sensing circuit 122 is connected to target pixels PXL in the sensing pixel group line via the readout lines 16 at the time of sensing driving. The sensing circuit 122 senses electrical properties of the drive TFTs DT included in the target pixels PX in at least one sensing period located in the vertical blank period through the readout lines 16.

The sensing circuit 122 may be implemented as a voltage sensing type sensing circuit or a current sensing type sensing circuit.

The voltage sensing type sensing circuit 122 may include a sampling circuit and an analog-digital converter. The sampling circuit directly samples specific node voltage of a target pixel PXL stored in a parasitic capacitor of the readout line 16. The analog-digital converter converts the analog voltage sampled by the sampling circuit into a digital sensing value, and transmits the digital sensing value to the timing controller 11.

The current sensing type sensing circuit 122 may include a current integrator, a sampling circuit, and an analog-digital converter. The current integrator integrates pixel current that flows in the target pixel PXL and outputs sensing voltage. The sampling circuit samples the sensing voltage output from the current integrator. The analog-digital converter converts the analog voltage sampled by the sampling circuit into a digital sensing value, and transmits the digital sensing value to the timing controller 11.

A compensation circuit included in the timing controller 11 may correct image data based on the digital sensing value to compensate for deviation in electrical properties between pixels. The corrected image data are converted into data voltage for display by the DAC 121, and are written in the pixels (display driving).

Meanwhile, the compensation circuit included in the timing controller 11 may further apply a luminance compensation gain to the corrected image data to minimize a cognitive error due to deviation in length of the luminance recovery period depending on the position of the sensing pixel group line. The image data having the luminance compensation gain further applied thereto are converted into data voltage for luminance recovery by the DAC 121, and are written in the pixels (luminance recovery driving).

Figure 7:
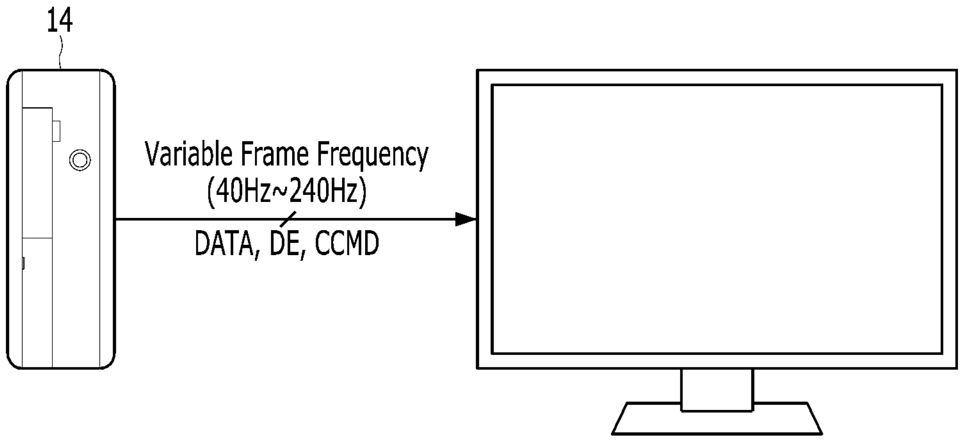
FIG. 7 is a view showing transmission and reception of signals based on a variable frame frequency between the host system and a timing controller.
Figure 8:
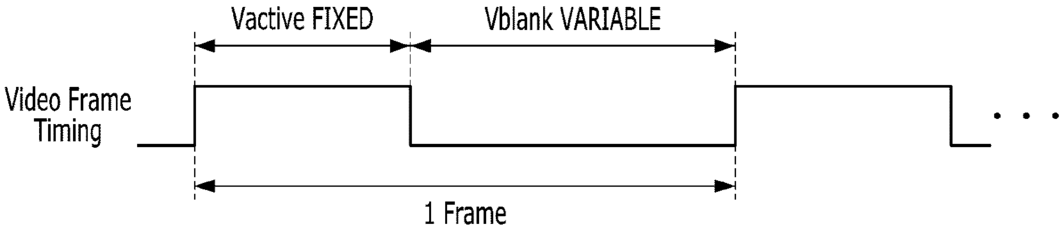
FIGS. 8 and 9 are views illustrating VRR technology for varying a frame frequency based on an input image.
Figure 9:
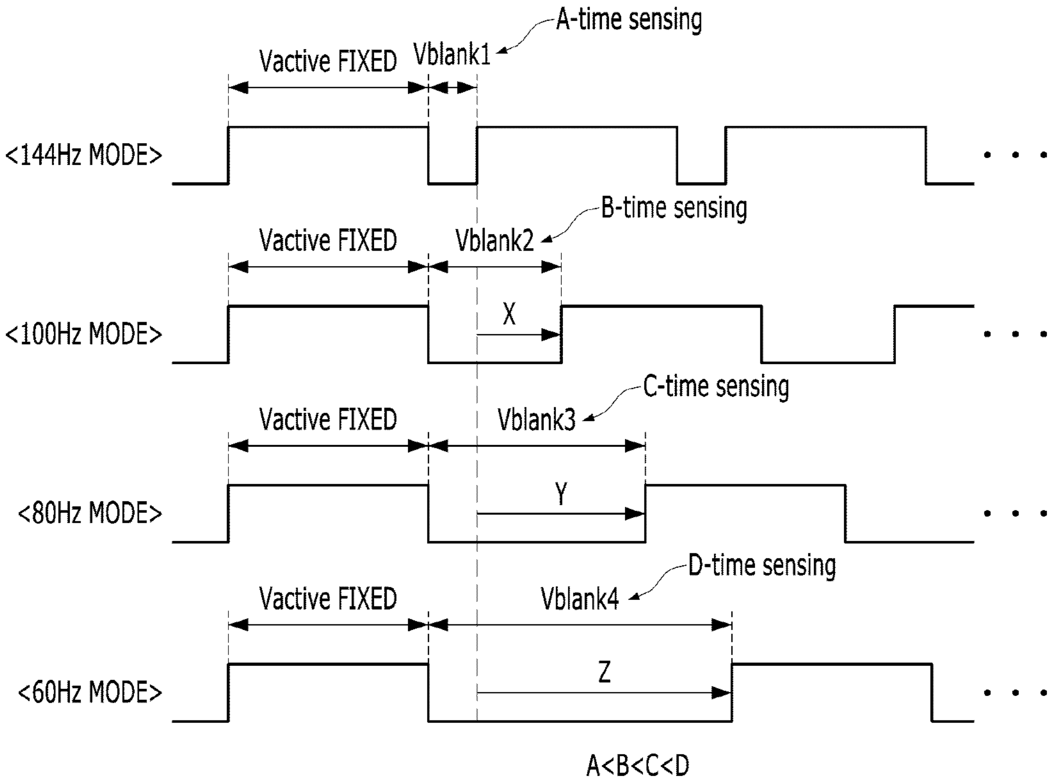

FIG. 7 is a view showing transmission and reception of signals based on a variable frame frequency between the host system and the timing controller. FIGS. 8 and 9 are views illustrating VRR technology for varying a frame frequency based on an input image.

Referring to FIG. 7, the host system 14 varies a frame frequency by changing the length of a vertical blank period (i.e. the length of a non-transition period of a data enable signal) in consideration of data rendering time of an input image. Problems due to abrupt image change caused by variation of the frame frequency, such as screen cutting, screen flickering, and input delay may be solved. The host system 14 may adjust the frame frequency within a frequency range of 40 Hz to 240 Hz depending on the data rendering time of the input image, or for a still image, the host system 14 may adjust the frame frequency within a frequency range of 1 Hz to 10 Hz; however, the present disclosure is not limited thereto. The variable frame frequency range may be differently set depending on model and specifications.

As shown in FIG. 8, the host system 14 may vary the rate of the frame frequency by fixing the length of a vertical active period Vactive and adjusting the length of a vertical blank period Vblank depending on the data rendering time of the input image. For example, as shown in FIG. 9, the host system 14 may include a first vertical blank period Vblank1 in order to implement a 144 Hz mode. The host system 14 may include a second vertical blank period Vblank2, which is longer by period "X" than the first vertical blank period Vblank1, in order to implement a 100 Hz mode. The host system 14 may include a third vertical blank period Vblank3, which is longer by period "Y" than the first vertical blank period Vblank1, in order to implement an 80 Hz mode. The host system 14 may include a fourth vertical blank period Vblank4, which is longer by period "Z" than the first vertical blank period Vblank1, in order to implement a 60 Hz mode.

The host system 14 may control the number of compensation command signals such that the number of times of sensing operation is increased in proportion to the length of the vertical blank period in the variable frame frequency environment. For example, as shown in FIG. 9, the host system 14 may generate compensation command signals A times (A being a natural number including 0) in predetermined intervals (e.g. one sensing period intervals) during the first vertical blank period Vblank1 in the 144 Hz mode such that sensing operation is performed A times, and may generate compensation command signals B times (B being a natural number greater than A) in predetermined intervals during the second vertical blank period Vblank2 in the 100 Hz mode such that sensing operation is performed B times. In the same manner, as shown in FIG. 9, the host system 14 may generate compensation command signals C times (C being a natural number greater than B) in predetermined intervals during the third vertical blank period Vblank2 in the 80 Hz mode such that sensing operation is performed C times, and may generate compensation command signals D times (D being a natural number greater than C) in predetermined intervals during the fourth vertical blank period Vblank4 in the 60 Hz mode such that sensing operation is performed D times. In the case in which the number of times of sensing operation is differently set depending on the length of the vertical blank period, as described above, compensation cycle delay may be prevented and image defects may be minimized.

Figure 10:
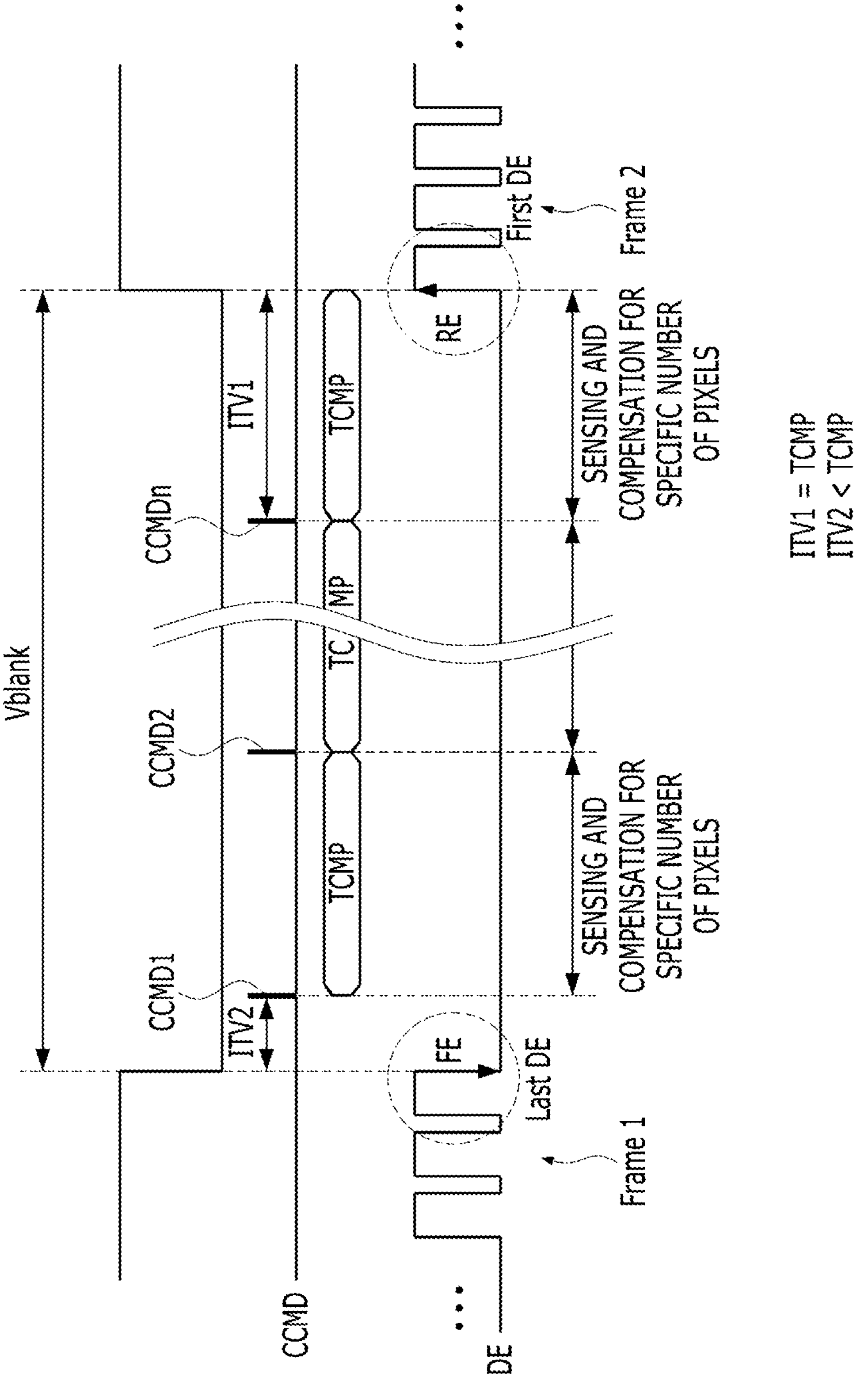
FIG. 10 is a view showing an example in which at least one sensing period is set in one vertical blank period so as to correspond to a compensation command signal.
Figure 11:
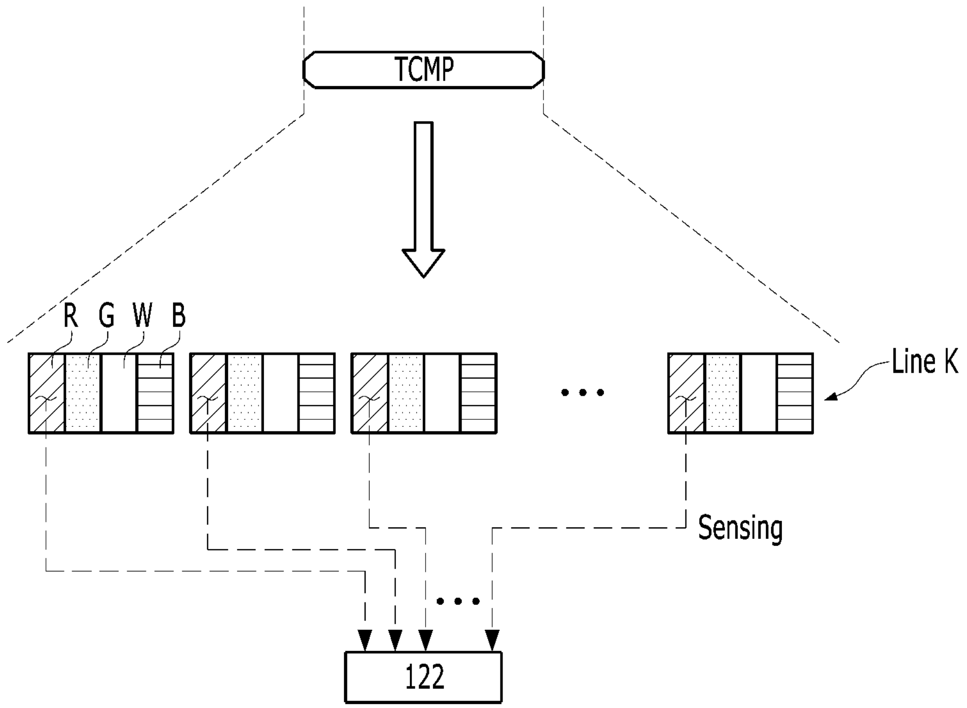
FIG. 11 is a view showing sensing operation performed in one sensing period of FIG. 10.

FIG. 10 is a view showing an example in which at least one sensing period is set in one vertical blank period so as to correspond to a compensation command signal. FIG. 11 is a view showing sensing operation performed in one sensing period of FIG. 10.

Referring to FIG. 10, a plurality of sensing periods TCMP may be set in one vertical blank period Vblank so as to correspond to a plurality of compensation command signals CCMD1 to CCMDn.

In response to each of the plurality of sensing periods, the panel drive circuit 121 and 13 (see FIG. 1) writes a scan signal for sensing and data voltage for sensing synchronized therewith in target pixels PXL, and the sensing circuit 122 (see FIG. 1) senses electrically property information (voltage or current) of the target pixels PXL. Consequently, the number of times of signal writing by the panel drive circuit 121 and 13 (see FIG. 1) and the number of times of sensing by the sensing circuit 122 (see FIG. 1) may be set depending on the number of sensing periods TCMP set in one vertical blank period Vblank. In other words, the number of sensing periods TCMP set in an identical vertical blank period Vblank may be recognized by the number of times of signal writing by the panel drive circuit 121 and 13 (see FIG. 1) and the number of times of sensing by the sensing circuit 122 (see FIG. 1) performed in the vertical blank period Vblank.

The vertical blank period Vblank is located between a falling edge FE of a last data enable signal DE belonging to a first frame and a rising edge RE of a first data enable signal DE belonging to a second frame, which follows the first frame.

A first time interval ITV1 between one of the compensation command signals CCMD1 to CCMDn (i.e. a last compensation command signal CCMDn) and the rising edge RE of the first data enable signal DE is uniform irrespective the length of the vertical blank period. In the case in which the first time interval ITV1 varies depending on the rate of the frame frequency, deviation in length of a luminance recovery period occurs for the same sensing pixel group line. As a result, sensing pixel group line compensation (hereinafter referred to as SLC) technology shown in FIGS. 14 to 15B cannot be applied, and the sensing pixel group line may be visible as a bright line or a dark line. It is preferable for the first time interval ITV1 to be fixed to one sensing period TCMP irrespective of the length of the vertical blank period in order to prevent occurrence of such a side effect.

Meanwhile, it is preferable for a second time interval ITV2 between a first compensation command signal CCMD1, among the compensation command signals CCMD1 to CCMDn, and the falling edge FE of the last data enable signal DE to also be uniformly set irrespective of the length of the vertical blank period. Here, the second time interval ITV2 may be defined as "a vertical blank period of the highest frame frequency—one sensing period." Since the "vertical blank period of the highest frame frequency" and the "one sensing period" are predetermined constant values, the second time interval ITV2 is also a constant value. Consequently, the second time interval ITV2 may be fixed to the same length, i.e. a length shorter than one sensing period TCMP irrespective of the length of the vertical blank period. In each vertical blank period having a variable length, a first compensation command signal CCMD1 and a first sensing period TCMP synchronized therewith are located after the second time interval ITV2. The second time interval ITV2 provides uniform reference information about a start point in time of the sensing period TCMP in each vertical blank period having a variable length, whereby accuracy in sensing is improved.

As shown in FIG. 11, one sensing period TCMP may be defined as time incurred in simultaneously sensing at least some of a plurality of pixels included in the same sensing pixel group line K (K being a natural number). R, G, B, and W pixels having different driving characteristics and light emission efficiencies are included in the same sensing pixel group line. In order to improve accuracy in sensing, therefore, it is more advantageous to separately sense the R, G, B, and W pixels. In consideration thereof, it is more preferable for one sensing period TCMP to be defined as time incurred in simultaneously sensing pixels that implement the same color, among a plurality of pixels included in the same sensing pixel group line Link K.

Figure 12:
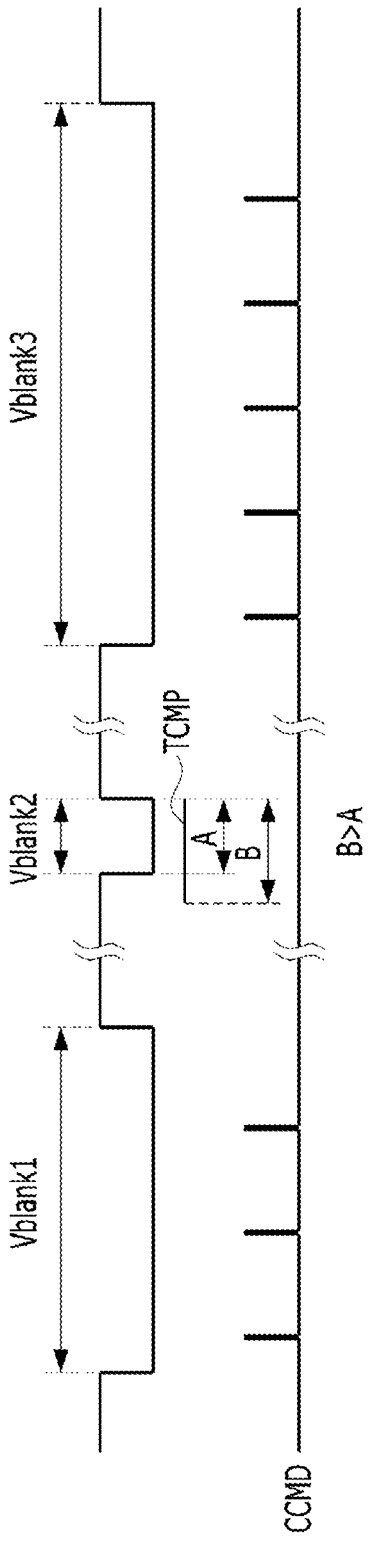
FIG. 12 is a view showing that the number of compensation command signals corresponding thereto is changed depending on the length of a vertical blank period in a variable frame frequency environment.

FIG. 12 is a view showing that the number of compensation command signals corresponding thereto is changed depending on the length of a vertical blank period in a variable frame frequency environment.

Referring to FIG. 12, compensation command signals CCMD may have the form of an individual control signal independent of another signal. A larger number of compensation command signals CCMD may be located in a third vertical blank period Vblank3, which is longer than a first vertical blank period Vblank1, than in the first vertical blank period Vblank1. For example, the number of compensation command signals CCMD in the first vertical blank period Vblank1 may be 3, whereas the number of compensation command signals CCMD in the third vertical blank period Vblank3 may be 5. Here, each of the first vertical blank period Vblank1 and the third vertical blank period Vblank3 is longer than one sensing period TCMP. As a result, sensing operation may be performed three times in the first vertical blank period Vblank1, and sensing operation may be performed five times in the third vertical blank period Vblank3.

Meanwhile, the length A of a specific vertical blank period may be shorter than the length B of one sensing period TCMP due to delay of an active period, which will be described with reference to FIGS. 16 and 17. As an example, in the case in which the specific vertical blank period is a second vertical blank period Vblank2 of FIG. 12, the host system may perform control such that no compensation command signal CCMD is located in the second vertical blank period Vblank2. In other words, the host system may skip generation of a compensation command signal CCMD in response to the vertical blank period shorter than one sensing period TCMP, whereby it is possible to prevent accuracy in sensing from being reduced due to insufficient sensing time.

Figure 13:
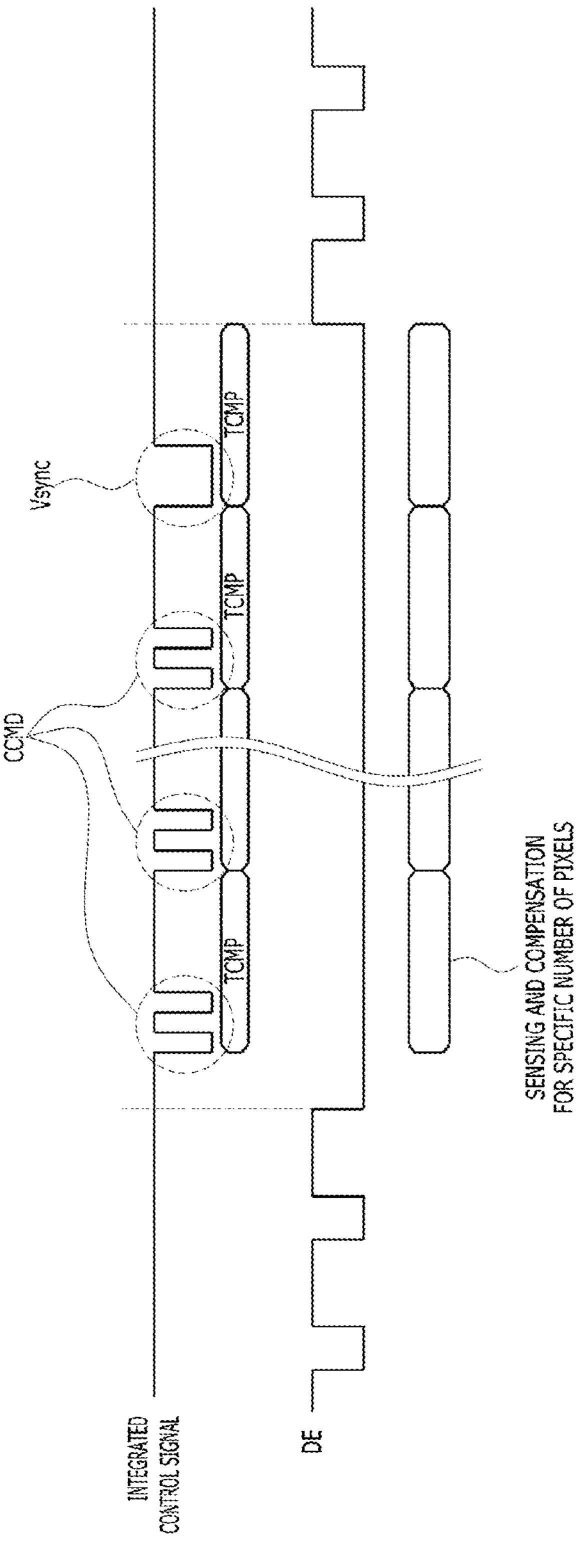
FIG. 13 is a view showing an example in which a compensation command signal has the form of an integrated control signal integrated with another signal.

FIG. 13 is a view showing an example in which a compensation command signal has the form of an integrated control signal integrated with another signal.

Referring to FIG. 13, a compensation command signal CCMD may have the form of an integrated control signal integrated with another signal. The integrated control signal may include a compensation command signal CCMD having a first pattern and a vertical synchronization signal Vsync having a second pattern, which is different from the first pattern. The number of transitions of the first pattern may be greater than the number of transitions of the second pattern; however, the present disclosure is not limited thereto. In the vertical blank period, the sensing period TCMP may be located so as to correspond to the compensation command signal CCMD having the first pattern and may also be located so as to correspond to the vertical synchronization signal Vsync having the second pattern. The vertical synchronization signal Vsync may be used not only to define one frame period but also to define a last sensing period TCMP in the vertical blank period. Meanwhile, in the case in which the length of the vertical blank period is short, the compensation command signal CCMD having the first pattern may be omitted, and only the vertical synchronization signal Vsync having the second pattern may be located in the vertical blank period. In this case, in the vertical blank period, one sensing period TCMP may be located so as to correspond to the vertical synchronization signal Vsync having the second pattern, or a period shorter than one sensing period TCMP and longer than "ITV2" of FIG. 10 may be located. This will be described below with reference to FIGS. 16 and 17.

Figure 14:
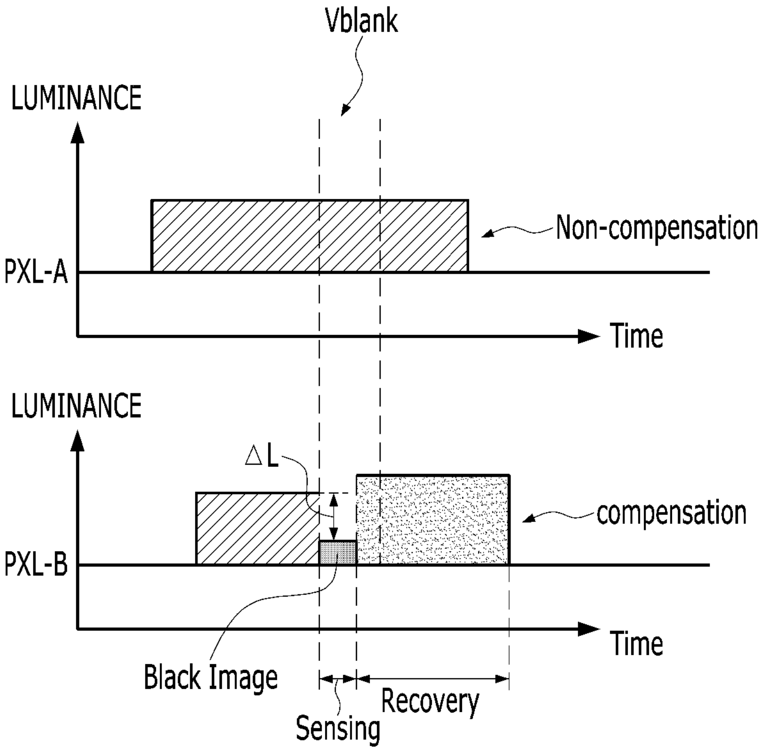
FIG. 14 is a view showing luminance recovery technology for compensating for luminance loss due to sensing.
Figure 15A:
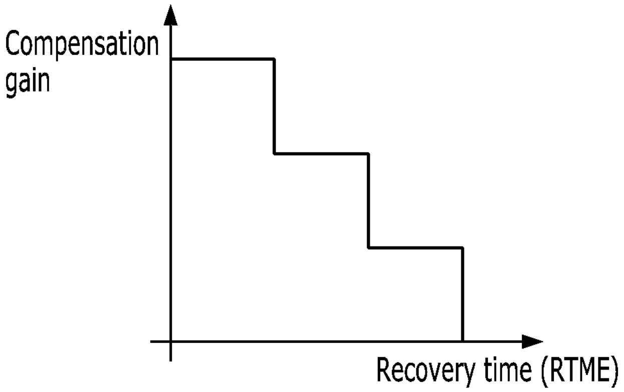
FIGS. 15A and 15B are views showing setting examples of a luminance compensation gain depending on luminance recovery time.
Figure 15B:
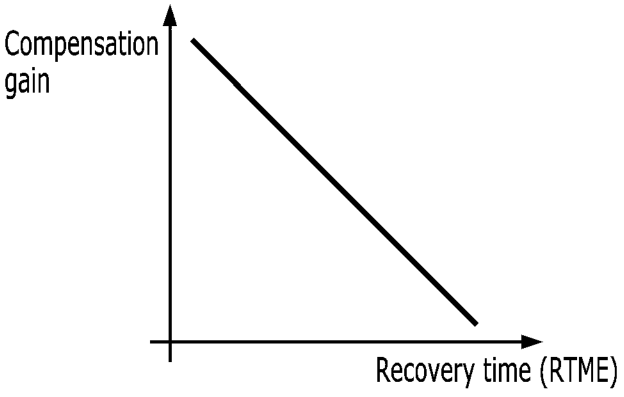

FIG. 14 is a view showing luminance recovery technology for compensating for luminance loss due to sensing. FIGS. 15A and 15B are views showing setting examples of a luminance compensation gain depending on luminance recovery time.

FIGS. 14 to 15B show SLC technology for compensating for deviation in length of a luminance recovery period depending on the position of the sensing pixel group line.

When an image is displayed on one screen in the state in which all pixels have identical brightness, as shown in FIG. 14, a sensing pixel PXL-B does not emit light during a sensing period in a vertical blank period Vblank and thus may exhibit luminance lower by "ΔL" than a non-sensing pixel PXL-A.

In order to compensate for luminance loss due to sensing, luminance recovery driving is performed for the sensing pixel PXL-B. Luminance recovery driving is performed immediately after sensing driving based on a luminance compensation gain. Since the sensing pixel having the luminance compensation gain applied thereto exhibits higher luminance during the luminance recovery period than other pixels, all pixels in one screen may substantially exhibit identical luminance. The luminance recovery period lasts until data voltage for display are written in a corresponding sensing pixel in a subsequent frame.

The size of the luminance compensation gain and the temporal length of the luminance recovery period may have an inversely proportional relationship therebetween. All sensing pixels have identical luminance loss irrespective of relative positions of the sensing pixels. Since luminance recovery periods having different lengths are matched with each other depending on the position of the sensing pixel group line, however, the size of the luminance compensation gain capable of compensating for the luminance loss may be differently applied in the sensing pixel group lines.

Correction operation of image data due to the luminance compensation gain may be performed by the timing controller. The compensation circuit of the timing controller may further include SLC compensation logic for further applying the luminance compensation gain to image data to be written in the pixel of the sensing pixel group line.

The size of the luminance compensation gain may be differentially matched for each luminance recovery block period grouped by a predetermined time size, as shown in FIG. 15A. In this case, the SLC compensation logic in the compensation circuit is simplified, and compensation processing speed is high.

The size of the luminance compensation gain may be differentially set for each individual luminance recovery period changed in every sensing pixel group line, as shown in FIG. 15B. In this case, accuracy in compensation is increased.

Figure 16:
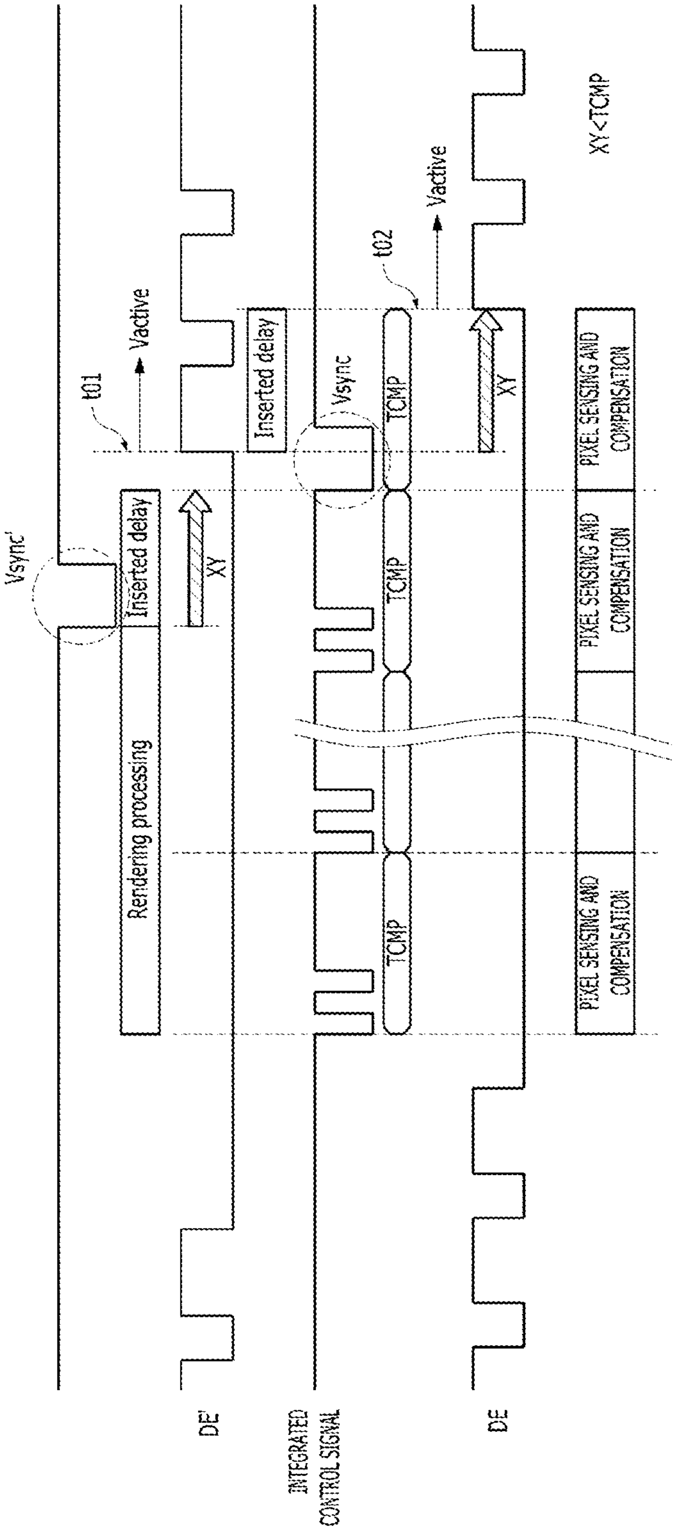
FIGS. 16 and 17 are views showing a signal delay operation of the host system for equalizing a time interval between a last compensation command signal in one vertical blank period and a vertical active period start point in time of a subsequent frame.
Figure 17:
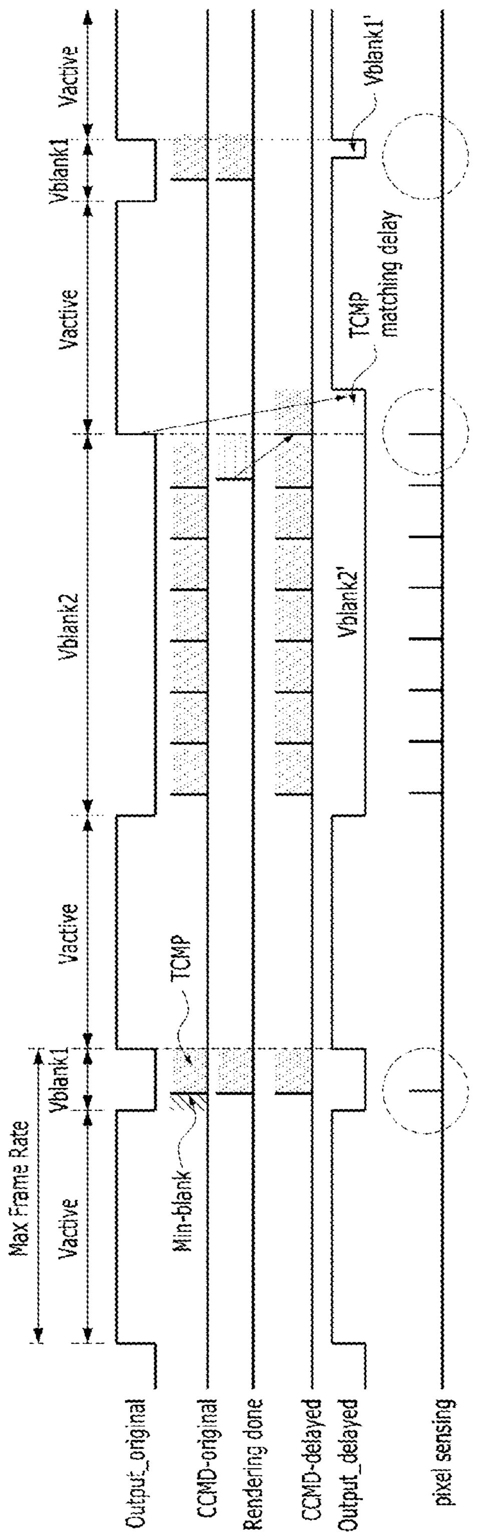

FIGS. 16 and 17 are views showing a signal delay operation of the host system for equalizing a time interval between a last compensation command signal in one vertical blank period and a vertical active period start point in time of a subsequent frame.

Referring to FIG. 16, the point in time at which rendering processing of an input image is completed and the point in time at which a last compensation command signal of the vertical blank period is generated may not coincide with each other due to variation of the frame frequency. In this case, the time interval between the point in time at which rendering processing of input image is completed and the point in time t01 at which the vertical active period is commenced is shorter than one sensing period TCMP. At this time, the host system may delay the vertical active period start point in time at which rendering data are output by XY from "t01" to "t02" such that the time interval between the point in time at which rendering processing of input image is completed and the point in time at which the vertical active period is commenced is equal to one sensing period TCMP. That is, the host system may delay the point in time at which the vertical active period is commenced by "XY" to further secure one sensing period TCMP. Through the delay, the point in time at which a new vertical active period is commenced is reset to "t02." The host system also delays the vertical synchronization signal Vsync by "XY" in order to further secure one sensing period TCMP, and further allocates one sensing period TCMP based on the delayed vertical synchronization signal Vsync. The delayed time "XY" is shorter than one sensing period TCMP.

Referring to FIG. 17, the point in time at which rendering processing of an input image is completed and the point in time at which a last compensation command signal of the vertical blank period is generated may or may not coincide with each other due to variation of the frame frequency.

For example, when the point in time at which rendering processing is completed coincides with the point in time at which the last compensation command signal of the vertical blank period is generated, as in the first vertical blank period Vblank1, the host system does not delay the point in time at which the vertical active period is commenced.

In contrast, when the point in time at which rendering processing is completed does not coincide with the point in time at which the last compensation command signal of the vertical blank period is generated, as in the second vertical blank period Vblank2, the host system delays the point in time at which the vertical active period is commenced and extends the second vertical blank period Vblank2 to a second' vertical blank period Vblank2'. In addition, a compensation command signal is further generated in the second' vertical blank period Vblank2', and one sensing period TCMP is further allocated.

Also, in the case in which the point in time at which rendering processing of the next frame is completed occurs during a vertical active period of the current frame during which a data enable signal and image data are being output as the point in time at which the vertical active period is commenced is delayed, a first' vertical blank period Vblank1' occurring immediately after completion of the current frame may be shorter than one sensing period TCMP. However, in this case, which is the case in which the frequency of the next frame approximates to the maximum frame frequency, the second' vertical blank period Vblank2' extended in the current frame does not exceed a maximum of one sensing period TCMP, compared to the second vertical blank period Vblank2, and therefore the vertical blank period Vblank of the next frame maintains a second time interval ITV2 (see FIG. 10), which is time from which a maximum of one sensing period TCMP is removed, or more, compared to an original first vertical blank period Vblank1. In this case, the host system skips generation of a compensation command signal, and no sensing period is allocated in the first' vertical blank period Vblank1'. Consequently, it is also not necessary for the relationship between the vertical synchronization signal Vsync and Active DE (defining the vertical active period) to maintain one sensing period TCMP, and therefore the interval between the vertical synchronization signal Vsync and Active DE may be shortened to the second time interval ITV2 (see FIG. 10).

Meanwhile, in FIG. 17, Min-blank means the second time interval ITV2 of FIG. 10.

Figure 18:
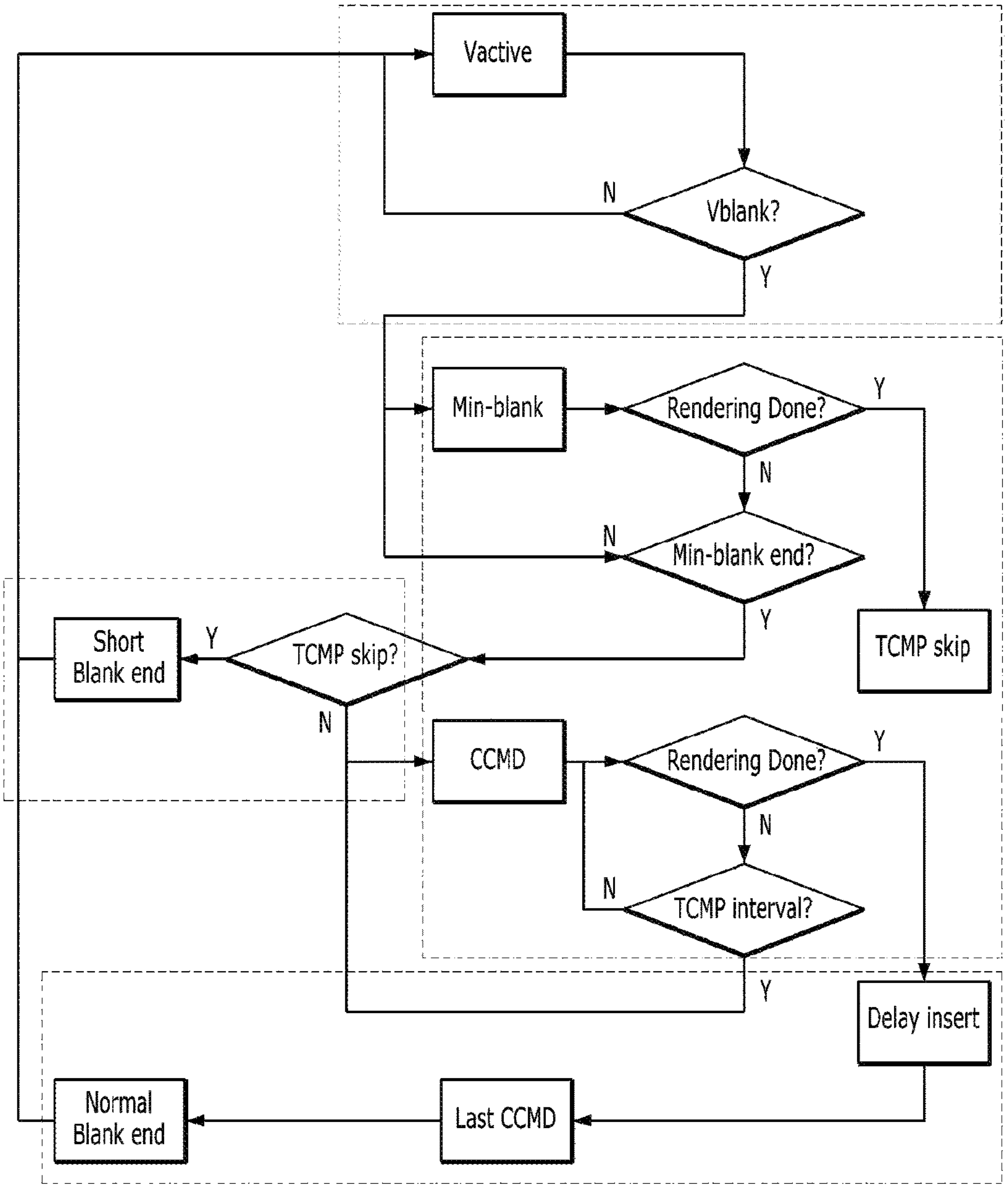
FIG. 18 is a flowchart showing a control sequence related to the signal delay operation of the host system.

FIG. 18 is a flowchart showing a control sequence related to the signal delay operation of the host system.

Referring to FIG. 18, the host system monitors entry into a vertical blank period and delay insertion of a previous frame based on a data enable signal. The host system processes Min Blank end (which means a Min-blank period of FIG. 17) and monitors whether rendering processing is completed. The host system processes Min Blank end (which means a Min-blank period of FIG. 17) even for a period other than an active period based on a data enable signal that is output, and monitors whether rendering processing is completed in a period between the active period and Min Blank end.

The host system generates a first compensation command signal CCMD after Min Blank end, generates subsequent compensation command signals in intervals of one sensing period TCMP (see FIG. 17), and monitors whether rendering processing is completed.

In the case in which, when the rendering processing is completed, the completed point in time is not synchronized with the point in time at which a last compensation command signal of a vertical blank period is generated, the host system delays the point in time at which a vertical active period is commenced and outputs image data and a data enable signal in a state of being matched with the delayed vertical active period. The host system generates a compensation command signal till a subsequent vertical active period in a predetermined interval (i.e. one sensing period interval) irrespective of the length of the vertical blank period by further generating a compensation command signal in the vertical blank period extended due to the delay and further allocating one sensing period.

Meanwhile, when a rendering processing completion signal is generated at the time of outputting the vertical active period and Min Blank end, the host system skips generation of a compensation command signal.

In this embodiment, as described above, when variation in electrical properties between pixels is compensated for using an external compensation scheme, the number of times of sensing is increased in proportion to the length of a vertical blank period (i.e. multi-sensing) even though a frame frequency is variable depending on an input image, whereby it is possible to minimize compensation cycle delay and image defects.

Various embodiments have been described herein for carrying out the present disclosure.

INDUSTRIAL APPLICABILITY

In this embodiment, when variation in electrical properties between pixels is compensated for using an external compensation scheme, the number of times of sensing is increased in proportion to the length of a vertical blank period (i.e. multi-sensing) even though a frame frequency is variable depending on an input image, whereby it is possible to minimize compensation cycle delay and image defects.

In this embodiment, in the case in which a plurality of compensation command signals is present in one vertical blank period for multi-sensing, the time interval between a last compensation command signal, among the compensation command signals, and the point in time at which a subsequent active period is commenced is fixed to one sensing period irrespective of the length of the vertical blank period according to variation of the frame frequency, whereby it is possible to easily apply SLC technology and to minimize a cognitive error due to sensing.

Therefore, the present disclosure has industrial applicability.

It will be apparent to those skilled in the art from the above description that various modifications and alterations are possible without departing the technical idea of the present disclosure. Therefore, the technical scope of the present disclosure should be restricted not by the above detailed description of the present disclosure.

The invention claimed is:

1. A display device comprising:

a display panel comprising a plurality of pixels;

a timing controller configured to receive a compensation command signal in a vertical blank period in which no image data are written in the pixels; and a sensing circuit configured to sense driving properties of the pixels in at least one sensing period corresponding to the compensation command signal, wherein a length of the vertical blank period is different from each other in a first frame and a second frame, and a number of sensing periods each having a predetermined length varies according to the length of the vertical blank period.

2. The display device according to claim 1, wherein the number of sensing periods increases according to the length of the vertical blank period.

3. The display device according to claim 1, wherein the number of sensing periods during at least one of the vertical blank period corresponds to a number of compensation command signals during the at least one of the vertical blank period.

4. The display device according to claim 1, wherein the vertical blank period is located between a falling edge of a last data enable signal in the first frame and a rising edge of a first data enable signal in the second frame, which follows the first frame, and a first time interval between a last compensation command signal, among the compensation command signals, and the rising edge of the first data enable signal is uniform irrespective of the length of the vertical blank period.

5. The display device according to claim 4, wherein the first time interval is fixed to one sensing period irrespective of the length of the vertical blank period.

6. The display device according to claim 1, wherein the vertical blank period is located between a falling edge of a last data enable signal belonging to a first frame and a rising edge of a first data enable signal belonging to the second frame, which follows the first frame, and a second time interval between a first compensation command signal, among the compensation command signals, and the falling edge of the last data enable signal is uniform irrespective of the length of the vertical blank period.

7. The display device according to claim 6, wherein the second time interval is shorter than one sensing period irrespective of the length of the vertical blank period.

8. The display device according to claim 1, wherein the vertical blank period comprises:

a first vertical blank period longer than one sensing period; and a second vertical blank period shorter than the one sensing period, and at least one compensation command signal is located in the first vertical blank period.

9. The display device according to claim 8, wherein the compensation command signal is not located in the second vertical blank period.

10. The display device according to claim 1, wherein the compensation command signal has a form of an integrated control signal integrated with another signal or a form of an individual control signal independent of the another signal.

11. The display device according to claim 10, wherein the integrated control signal comprises a compensation command signal having a first pattern and a vertical synchronization signal having a second pattern, which is different from the first pattern, and the vertical synchronization signal defines one frame period.

12. The display device according to claim 10, wherein the integrated control signal is implemented by a vertical synchronization signal for defining one frame period.

13. The display device according to claim 1, wherein the sensing period is a time period for at least some of the plurality of pixels to be substantially simultaneously sensed.

14. The display device according to claim 1, further comprising:

a host system configured to generate the compensation command signal and to output the compensation command signal to the timing controller, wherein the host system is configured to control the length of the vertical blank period according to complexity of an input image.

15. The display device according to claim 14, wherein whether the compensation command signal is generated and the number of compensation command signals vary according to the length of the vertical blank period and the predetermined length of one sensing period.

16. The display device according to claim 15, wherein generation of the compensation command signal is skipped when the length of the vertical blank period is shorter than the predetermined length of the one sensing period.

17. The display device according to claim 14, wherein a length of a vertical active period following the vertical blank period is fixed irrespective of complexity of the input image.

18. The display device according to claim 17, wherein, in a case in which a time interval between a point in time at which rendering processing of the input image is completed and a point in time at which the vertical active period is commenced is shorter than the one sensing period due to variation of a frame frequency, the host system delays the point in time at which the vertical active period is commenced.

19. The display device according to claim 18, wherein any one of the compensation command signals corresponds to one sensing period secured by the delay.

20. A method of driving a display device, the method comprising:

receiving a compensation command signal in a vertical blank period in which no image data are written in a plurality of pixels; and sensing driving properties of the plurality of pixels in at least one sensing period corresponding to the compensation command signal, wherein a length of the vertical blank period is different from each other in a first frame and a second frame, and a number of sensing periods each having a predetermined length corresponds to the length of the vertical blank period.

* * * * *